(12) United States Patent
Gaillard

(10) Patent No.: US 10,542,132 B2
(45) Date of Patent: Jan. 21, 2020

(54) UPDATING CONTACT DETAILS FOR COMMUNICATIONS

(71) Applicant: Mitel Networks Corporation, Ottawa (CA)

(72) Inventor: Lionel Gaillard, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 16/107,959

(22) Filed: Aug. 21, 2018

(65) Prior Publication Data
US 2019/0075198 A1    Mar. 7, 2019

(30) Foreign Application Priority Data

Aug. 25, 2017  (EP) .................................. 17187944

(51) Int. Cl.
| | | |
|---|---|---|
| *H04M 3/42* | (2006.01) | |
| *H04M 1/2745* | (2006.01) | |
| *H04L 12/58* | (2006.01) | |
| *H04M 1/57* | (2006.01) | |

(52) U.S. Cl.
CPC .... *H04M 1/274516* (2013.01); *H04L 51/046* (2013.01); *H04M 1/57* (2013.01); *H04M 3/42042* (2013.01)

(58) Field of Classification Search
CPC ..... H04M 1/274516; H04M 3/42; H04Q 7/20
See application file for complete search history.

(56) References Cited

U.S. PATENT DOCUMENTS

| | | | | |
|---|---|---|---|---|
| 2008/0242322 | A1* | 10/2008 | Scott ..................... | H04W 48/08 455/466 |
| 2012/0063585 | A1* | 3/2012 | Gravino .......... | H04M 1/274516 379/218.01 |

FOREIGN PATENT DOCUMENTS

WO    WO 2004/017654 A1    2/2004

* cited by examiner

*Primary Examiner* — Myron Wyche

(57) ABSTRACT

A method and system for updating contact details of users is disclosed. The method comprises providing a contact record for each of a plurality of users, the contact record for each user comprising a plurality of fields, wherein at least one of the contact records for a first user has a first user identifier in a first field having an associated first communications method. A subsequent step may comprise receiving a communication from a user by means of a second, different communications method, the communication having an associated second user identifier corresponding to at least part of the first user identifier. A subsequent step may comprise identifying the contact record for the first user based on the second user identifier. A subsequent step may comprise updating the identified contact record so that at least one of the fields comprises new information from the second user identifier.

20 Claims, 12 Drawing Sheets

Contact Details

| | | |
|---|---|---|
| Landline (Home) | 47 | Voice |
| Landline (Work) | 48 | Voice |
| Mobile #1 | 49 | Voice, SMS, IM |
| Mobile #2 | 50 | Voice, SMS, IM |
| Email | 51 | Email |
| Skype | 52 | Voice, IM |

[Edit] [Save]

| Serial No. | Surname, Given Name |
|---|---|
| 1234 | Doe, John |
| etc. | |

Contact Details for Jane Doe

Landline (Home) _47_
Landline (Work) _48_
Mobile #1 _49_ 01234 5678901
Mobile #2 _50_
Email _51_
Skype _52_

Edit   Save

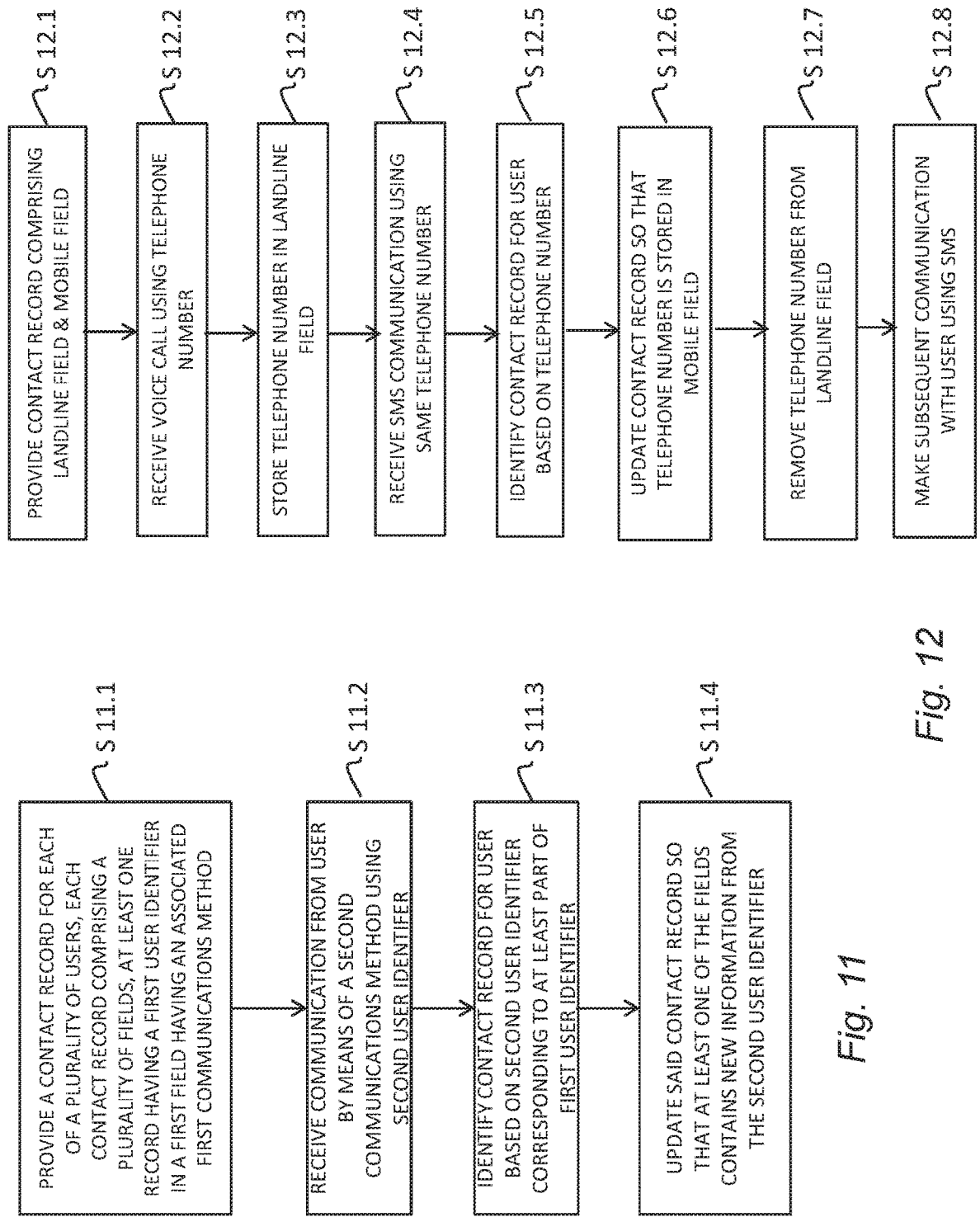

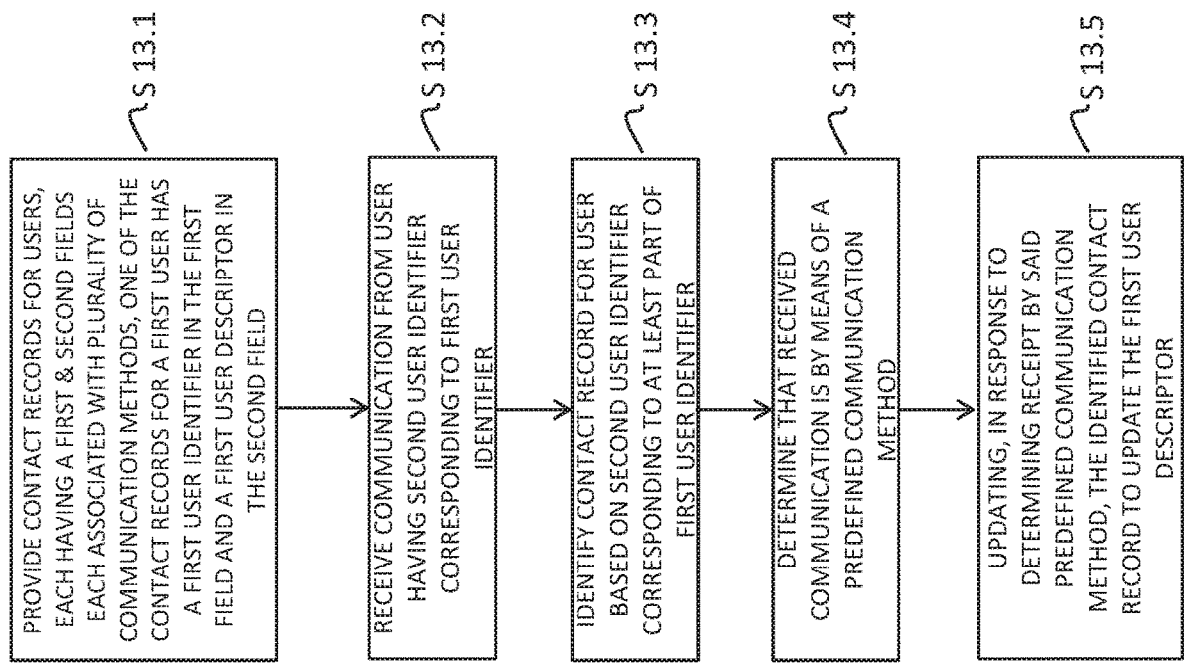

UPDATING CONTACT DETAILS FOR COMMUNICATIONS

CROSS REFERENCE TO RELATED APPLICATIONS

This application claims the benefit and priority of European Patent Application No. EP 17187944.8 entitled "UPDATING CONTACT DETAILS FOR COMMUNICATIONS," filed on Aug. 25, 2017, the contents of which are hereby incorporated herein by reference.

FIELD

The present invention relates to methods and systems for updating contact details for communications, particularly, though not exclusively, in a contact centre of, for example, a unified communications system.

BACKGROUND

Many companies offer contact centres where consumers may contact the company for customer services. For example, the company may have a website. The company website may have a support page where the customer may be given several options for customer support. The website may allow the customer the option to call, send a text message, send an email or have a chat session with a customer representative.

Contact centres may maintain contact details for users, be they customers registered with the associated company, potential customers or any other form of user. The contact details may be stored in a database. The contact details may store one or more of a name, address, telephone number, postal address and email address, as well as other information for helping a contact centre agent locate information relevant, for example, to a registered user's account. For example, by storing a user's telephone number, the contact centre may contact the user with information of interest to them or respond to a query. The query may be received using any method, not necessarily by telephone. If the contact details comprise a mobile telephone number, the contact centre may send information by text message, e.g., using the short messaging service (SMS).

The contact details may be stored as part of a unified communications system. A unified communications system is one in which different forms of enterprise communication services are integrated, for example voice, instant messaging, presence information, audio, web and videoconferencing services, voicemail, to name but some. One or more platforms may be used for this purpose. In some cases, a unified communications system may allow an individual to send a message on one medium or service and to receive the same message on another medium or service.

A unified communications system may typically be implemented by users installing a client application on their own equipment, for example on their computer and/or mobile telephone, which enables communication with other users of the communications system via a centralised server running a corresponding server application. The contact details may be stored by, or in association with, the centralised server and the server application provides an interface whereby contact details can be entered.

Typically, applications for entering and maintaining contact details provide multiple fields for respective types of communication method, e.g., landline, mobile telephone, work telephone, email address etc. In the event that contact details for a first communication method (e.g., mobile telephone number) are stored against a different field (e.g., landline) then it can be time-consuming and cumbersome to update, involving multiple manual interactions with the application and processor. The application for example may not permit certain types of communication method for certain fields, e.g., text message cannot be send to a number stored in a landline field.

Similarly, other communications terminals such as mobile telephones store contact details, in the form of contact lists or phonebook applications. These may function in a similar way, providing multiple fields for respective types of communication method. They may have similar limitations in terms of limiting the ability of certain types of communications method to be applied to one or more fields. Maintenance of the contact details is similarly time consuming and cumbersome, involving multiple manual interactions with the application and processor.

SUMMARY

A first aspect of the invention provides a method for updating contact details of users, the method comprising: providing a contact record for each of a plurality of users, the contact record for each user comprising a plurality of fields, wherein at least one of the contact records for a first user has a first user identifier in a first field having an associated first communications method; receiving a communication from a user by means of a second, different communications method, the communication having an associated second user identifier corresponding to at least part of the first user identifier; identifying the contact record for the first user based on the second user identifier; and updating the identified contact record so that at least one of the fields comprises new information from the second user identifier.

The second user identifier may be the same as the first user identifier and updating the identified contact record may comprise inserting the second user identifier in a second, different, field associated with the second communications method.

The first user identifier may be a telephone number, the first field may be a non-mobile telephone field, the second communications method may be a text message associated with the same telephone number, and the contact record may be updated so that the telephone number is associated with a mobile telephone field.

The second communications method may be an SMS text message.

The non-mobile telephone field may be a landline telephone field.

Thus, there may be provided a method whereby a text message is received, associated with a telephone number already present in a contact record, but associated with a different contact record field, e.g., landline, which is not associated with sending text messages. The method may involve updating the contact record so that the telephone number is stored in a different, e.g., mobile, field which is associated with sending text messages.

The method may comprise removing the telephone number from the non-mobile telephone field of the contact record for the first user.

The updating may be performed automatically, without human intervention.

The method may be performed at a customer call centre.

The method may be performed by a mobile communications device.

A second aspect of the invention may provide a method for updating contact details of users, the method comprising: providing a contact record for each of a plurality of users, the contact record for each user comprising a plurality of fields, the contact record for each user comprising a plurality of fields including a first field associated with a plurality of communication methods and a second field associated with a plurality of communications methods, wherein at least one of the contact records for a first user has a first user identifier in the first field and a first user descriptor in the second field; receiving a communication from a user having an associated second user identifier corresponding to the first user identifier; identifying the contact record for the first user based on the second user identifier; determining that the received communication is received by means of a predefined communications method; updating, in response to determining receipt by said predefined communications method, the identified contact record so that the first user descriptor is updated in the second field; and wherein the updating is performed automatically, without human intervention. For example, the first field may correspond to an email address associated with communication methods such as email and chat. For example, the second field may correspond to a name, associated with all or a subset of communications methods such as email, chat, voice etc. For example, the predefined communication method may be email, responsive to which the second field may be updated, for example to enter a more complete name in the second field. The more complete name may be provided in the email itself or may be in the email header. For example, it may comprise the full name.

A third aspect of the invention provides a system configured to perform the method of any preceding definition.

A fourth aspect of the invention comprises a computer program, the comprising instructions that when executed by a computer control it to perform the method of any preceding method definition.

A fifth aspect of the invention provides a non-transitory computer-readable medium having stored thereon computer-readable code, which, when executed by at least one processor, causes the at least one processor to perform a method, comprising: providing a contact record for each of a plurality of users, the contact record for each user comprising a plurality of fields, wherein at least one of the contact records for a first user has a first user identifier in a first field having an associated first communications method; receiving a communication from a user by means of a second, different communications method, the communication having an associated second user identifier corresponding to at least part of the first user identifier; identifying the contact record for the first user based on the second user identifier; and updating the identified contact record so that at least one of the fields comprises new information from the second user identifier.

A sixth aspect of the invention provides an apparatus, the apparatus having at least one processor and at least one memory having computer-readable code stored thereon which when executed controls the at least one processor to: provide a contact record for each of a plurality of users, the contact record for each user comprising a plurality of fields, wherein at least one of the contact records for a first user has a first user identifier in a first field having an associated first communications method; receive a communication from a user by means of a second, different communications method, the communication having an associated second user identifier corresponding to at least part of the first user identifier; identify the contact record for the first user based on the second user identifier; and update the identified contact record so that at least one of the fields comprises new information from the second user identifier.

BRIEF DESCRIPTION OF THE DRAWINGS

Exemplary embodiments of the invention are described below with reference to the accompanying drawings, in which:

FIGS. 4A and 4B illustrate, respectively, data within a user details module and a user contact data module, shown in FIG. 3;

FIG. 9 is a graphical view of the second user interface, updated in accordance with embodiments;

FIG. 11 is a flow diagram showing steps performed by the unified communications platform, in accordance with embodiments;

FIG. 12 is a flow diagram showing detailed steps performed by the unified communications platform, in accordance with a particular embodiment; and FIG. 13 is a flow diagram showing steps performed by the unified communications platform, in accordance with embodiments.

DETAILED DESCRIPTION OF THE EMBODIMENTS

Figure 1:
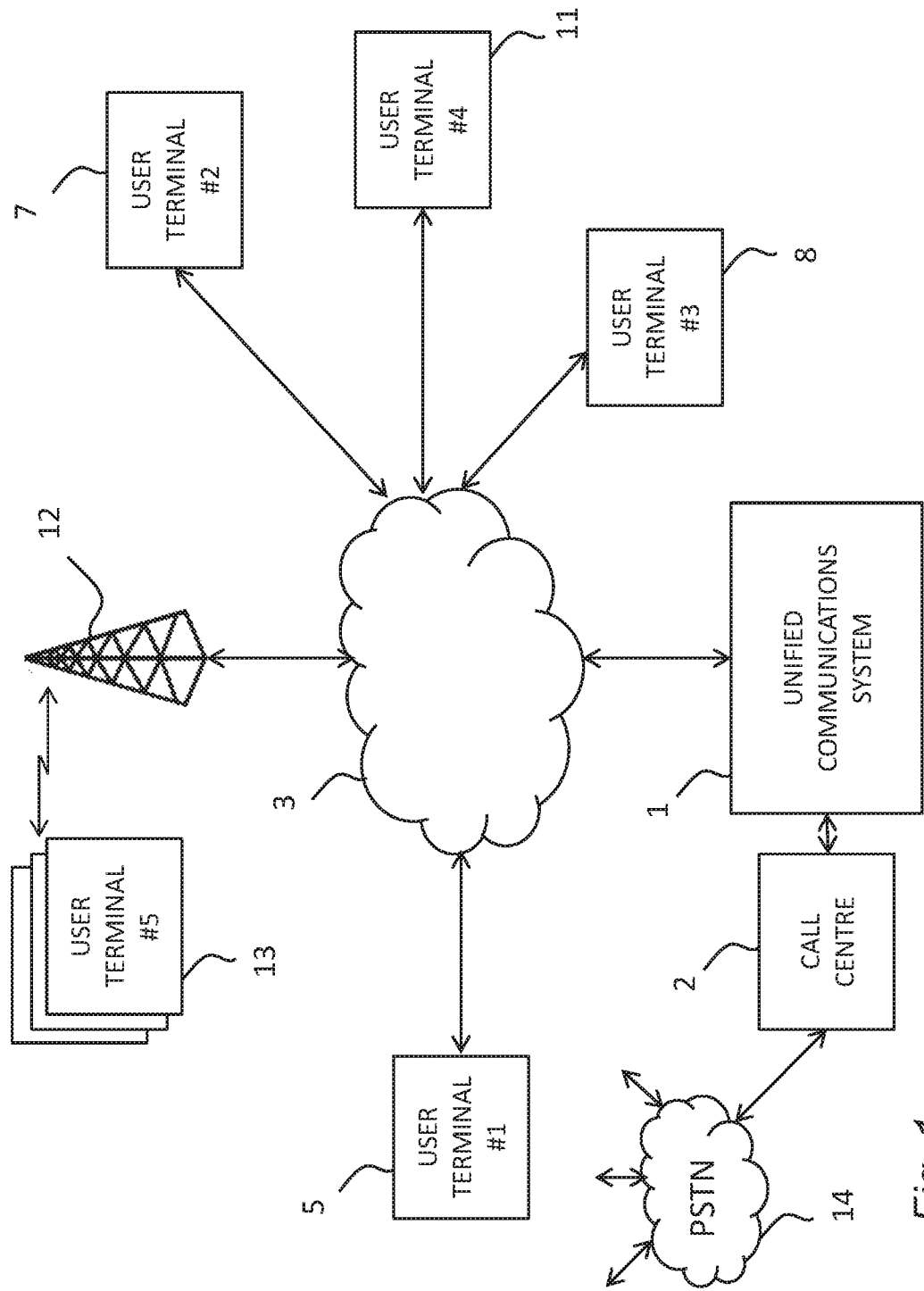
FIG. 1 is a block diagram of a plurality of user terminals connected to a unified communications system via a network.

In the description and drawings, like reference numerals refer to like elements throughout.

Embodiments herein relate to methods and systems for updating user contact details for communications. Contact details are usually stored in a list, or in database form, comprising for each user one or more fields.

For example, one field may comprise the user's name, which may be divided into a given name and a surname. The user's name may be a company name. Another field may comprise a description, e.g., providing additional information on the user or company. Another field may comprise a Uniform Resource Locator (URL) which identifies a website associated with the user.

One or more fields may be associated with one or more communications methods.

For example, a first field may be associated with a landline telephone for transmitting and/or receiving communications by voice or fax. The first field may be labelled as "home", "landline" or something similar. For example, a second field may be associated with a mobile telephone number for transmitting and/or receiving communications by voice or text message. The second field may be labelled as "mobile" or something similar. One or more other fields may comprise an email address for email communications. Multiple occurrences may be provided for a common communications method, e.g., a home landline, a work landline, a personal mobile, a work mobile. Each may be labelled accordingly to distinguish them.

Associated with each field may be a user identifier. In the case of an email field, the user identifier may be an email address. In the case of a landline field, the user identifier may be a telephone number. In the case of a mobile field, the user identifier may be a telephone number.

Contact details may be provided in the form of a so-called "contacts" folder or application ("app") which, in some cases, may be referred to as a phonebook or something similar.

User contacts may be created by users by opening the appropriate contacts folder or app and selecting "add new" or something similar, such as by selecting an "+" icon. The operating user may then enter details of the contact, for example one or more of their name, address, telephone number(s) and email address. This is a manual process, usually involving multiple interactions with the user terminal. In the case of telephone numbers, the first presented field of telephone number(s) is usually "home" or "landline" and corresponds to the user's landline telephone number.

Another method for creating user contacts is to save the user identifier associated with a received communication into the user contact folder or app. For example, the operating user may receive an email from a new contact, and may subsequently create a new contact entry in which the email address associated with the email is stored alongside the "email" field. Similarly, a received telephone call from a new contact will usually be accompanied by the caller identity (CLID), which is the telephone number from which the call is made. Upon receipt of a call, or after terminating the call, the operating user may create a new contact entry in which the telephone number is stored alongside the appropriate field.

Indeed, in many systems which provide user contacts folders or apps, a telephone number is assumed to be a landline telephone number and hence is assigned to the corresponding field by default. If the telephone number is actually a mobile telephone number, then certain applications of the user terminal may not permit certain communications methods, such as text messages, to be used because the telephone number is stored against the "landline" field. In many cases, applications of the user terminal will only permit text messages to be sent to telephone numbers stored against the "mobile" field. An operating user therefore needs to identify that the telephone number is, in fact, a mobile number and then has to manually update the contact folder or app to re-assign the telephone number to the "mobile" field. This is a laborious, time-consuming process involving multiple user interactions and processing iterations by the device processor. It may also result in a duplication of entries in the contact list, e.g., the same number for the "landline" and "mobile" fields, which results in inefficient use of memory.

Where a large number of user details are stored in a user contacts folder or app, it follows that there is the potential for significant time, processing and memory wastage, as well as inconvenience to users.

A first embodiment herein relates to methods and systems for updating user contact details in a unified communications and collaboration system (UCS.) A UCS refers to the integration of a plurality of enterprise communication technologies, for example voice, instant messaging, presence information, audio, web and videoconferencing services, to name but some. One or more platforms may be used for this purpose. The application of embodiments to UCC as described herein, however, is by way of example and the methods and systems may be applied to other data communications technologies.

FIG. 1 is a block diagram of a typical communications network, including a unified communications system (UCS) 1. The UCS 1 may have an associated call centre 2 which is staffed by one or more call centre agents for receiving and/or transmitting communications from and/or to users, or potential users, of the UCS using any suitable communications method, such as those mentioned above. The UCS 1 is connected to a data network 3, for example an Internet Protocol (IP) network such as the Internet, for communication with one or more other user terminals or equipment. For example, first to fifth user terminals 5, 7, 8, 11, 13 are connected to the data network 3. Each of the first to fifth user terminals 5, 7, 8, 11, 13 may be, for example, a personal computer (PC), laptop, tablet computer, mobile telephone, smartphone, personal digital assistant (PDA), or a tele or video-conferencing terminal, to give some examples. Any suitable data communications terminal is applicable. For example, the first, second and fourth user terminals 5, 8, 11 may be laptops, the third user terminal 8 a video-conferencing terminal and the fifth user terminal 13 a smartphone which connects to the data network 3 by means of a cellular antenna 12 and other related nodes. The call centre 2 may communicate with users associated with the user terminals 5, 7, 8, 11, 13 via the UCS 1. In some situations, the call centre 2 may communicate with users via a public switched telephone network (PSTN) 14 or a mobile network (not shown.)

The UCS 1 may provide a UCS platform by which the call centre 2 may communicate with said users associated with the first to fifth terminals 5, 7, 8, 11, 13, and said users may communicate with one another using one or more UCS client applications. The UCS 1 may typically be a server, a plurality of servers, a computer, or a plurality of computers, arranged to provide a centralised platform by which respective users of said first to fifth terminals 5, 7, 8, 11, 13 may communicate using one or more communications functions, such as voice, SMS text messaging, instant messaging, presence information, audio, web and videoconferencing services, to name but some.

Figure 2:
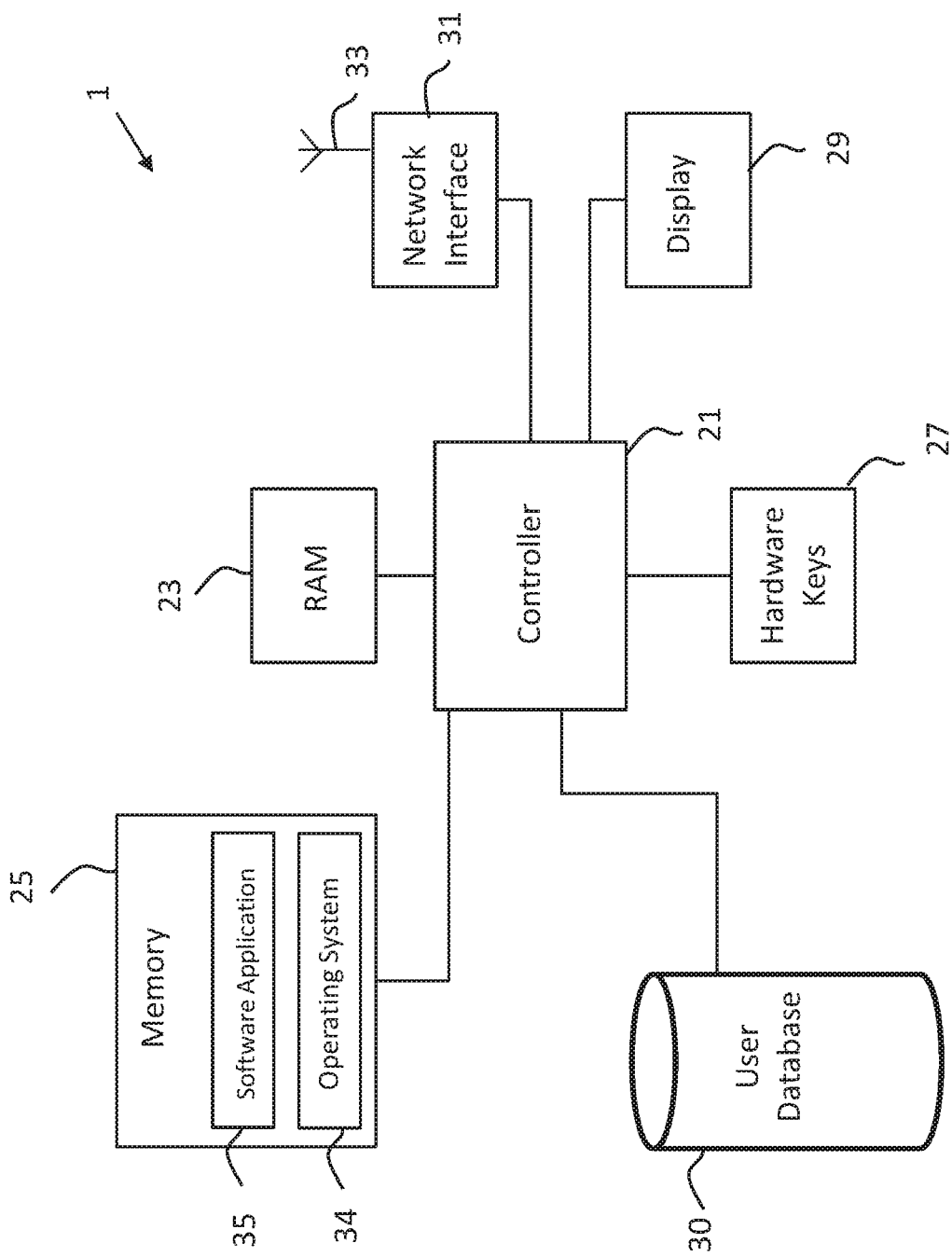
FIG. 2 is a schematic diagram of components of the FIG. 1 unified communications system.

Referring to FIG. 2, components of the UCS 1 are shown. The UCS 1 may comprise a controller 21, RAM 23, a memory 25, and, optionally, hardware keys 27 and a display 29. The UCS 1 may comprise a network interface 31, which may be a data port for connecting the system to the network 3. The hardware keys 27 and the display 29 may be part of the call centre 2.

The network interface 31 may additionally or alternatively comprise a radiofrequency wireless interface for transmitting and/or receiving data using a wireless communications protocol, e.g., WiFi. An antenna 33 may be provided for this purpose.

A user database 30 for storing data associated with one or more registered users or their associated user terminal(s) may also be provided and connected to the controller 21. The call centre 2 may have access to the user database 30 and may update the user database 30, for example to add, update, maintain, remove and/or edit details stored therein. The user database 30 in some circumstances may be updated automatically, as will be explained.

The memory 25 may be a non-volatile memory such as read only memory (ROM), a hard disk drive (HDD) or a solid state drive (SSD). The memory 25 stores, amongst other things, an operating system 34 and may store software applications 35. The RAM 23 is used by the controller 21 for the temporary storage of data. The operating system 34 may contain code which, when executed by the controller 21 in conjunction with the RAM 23, controls operation of each of the hardware components of the UCS 1.

The controller 21 may take any suitable form. For instance, it may be a microcontroller, plural microcontrollers, a processor, or plural processors.

In some embodiments, the UCS 1 may also be associated with external software applications not stored on the UCS. These may be applications stored on a remote server device and may run partly or exclusively on the remote server device. These applications may be termed cloud-hosted applications.

The software application 35 may provide a UCS platform, namely one or more software functions for enabling communication between the first to fifth terminals 5, 7, 8, 11, 13 in accordance with methods to be explained below. The software application 35 (or a separate software application 35) may also automatically update data in the user database 30.

Figure 3:
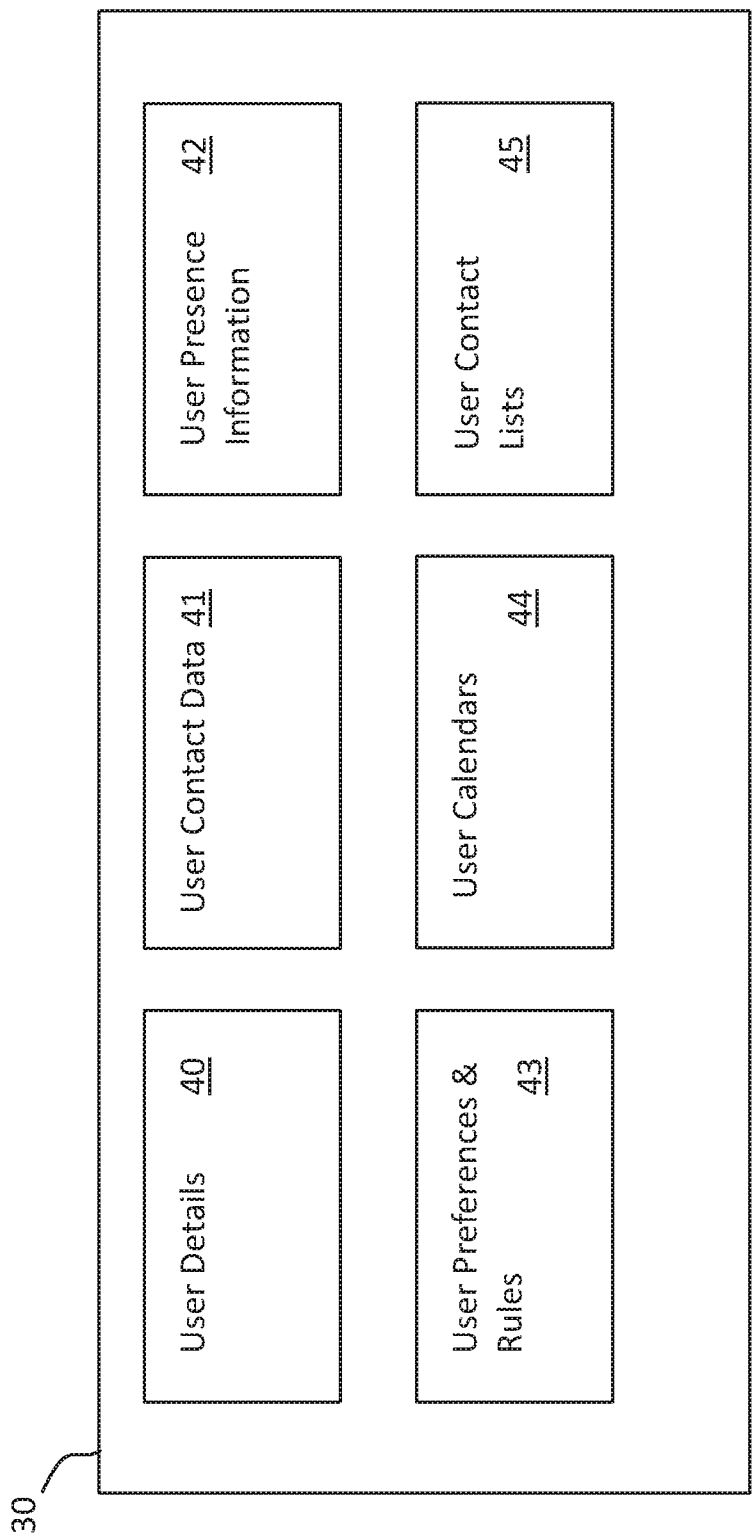
FIG. 3 is a schematic diagram of data modules used in a database of the FIG. 1 unified communications system.

Referring to FIG. 3, the user database 30 is configured to store and update a plurality of data modules 40-45. A first data module 40 stores user details for users registered with the UCS 1. The first data module 40 may also store user details for potential users of the UCS 1, but not yet registered. For example, any user that initiates a communication with the call centre 2 may have their details, for example their CLID, stored. This may be performed for various purposes, e.g., for marketing purposes, for following-up on user enquiries and, of course, to avoid duplication of effort and processing resources if the potential user becomes a registered user later on.

For example, referring to FIG. 4A, the first data module 40 may store, for each user, an internal user number and user name. The use number may be a unique serial number. The user name may be the given name and surname of the user. A separate field may identify if the user is a registered user or a potential user.

A second data module 41 stores user contact data for each user in the first data module 40. Referring to FIG. 4B, the second data module 41 may store, against each user serial number, user identifiers associated with a plurality of communications fields 46. For example, a first communications field 47 may be for a home landline; a second communications field 48 may be for a work landline; a third communications field 49 may be for a first mobile telephone; a fourth communications field 50 may be for a second mobile telephone; a fifth communications field 51 may be for email; and a sixth communications field 52 may be for Skype. A greater or lesser number of communications fields 46 may be provided.

Associated with each communications field 46 may be one or more associated communications method(s). For example, the landline fields 47, 48 are associated with voice only. The mobile fields 49, 50 are associated with voice, SMS text messaging and instant messaging only. The email field 51 is associated with email only. The Skype field 52 is associated with voice and instant messaging only. It will be appreciated that different communications may be associated with the respective communications fields 46 and the above is given merely by way of example.

A third data module 42 stores user presence information reflecting the user's status, for example "available", "busy", "do not disturb", "in a meeting", "on leave", "out of hours" or "sleeping." The user presence information may be updated manually by users or updating may be performed automatically. A fourth data module 43 stores user preferences and rules, for example rules determining which communications functions are enabled or inhibited based on the presence or status information. A fifth data module 44 stores calendar information for each user, for example dates and times of meetings, appointments and so on. A sixth data module 45 stores contact lists of other registered users that each respective user has added to their personal list.

Figure 5:
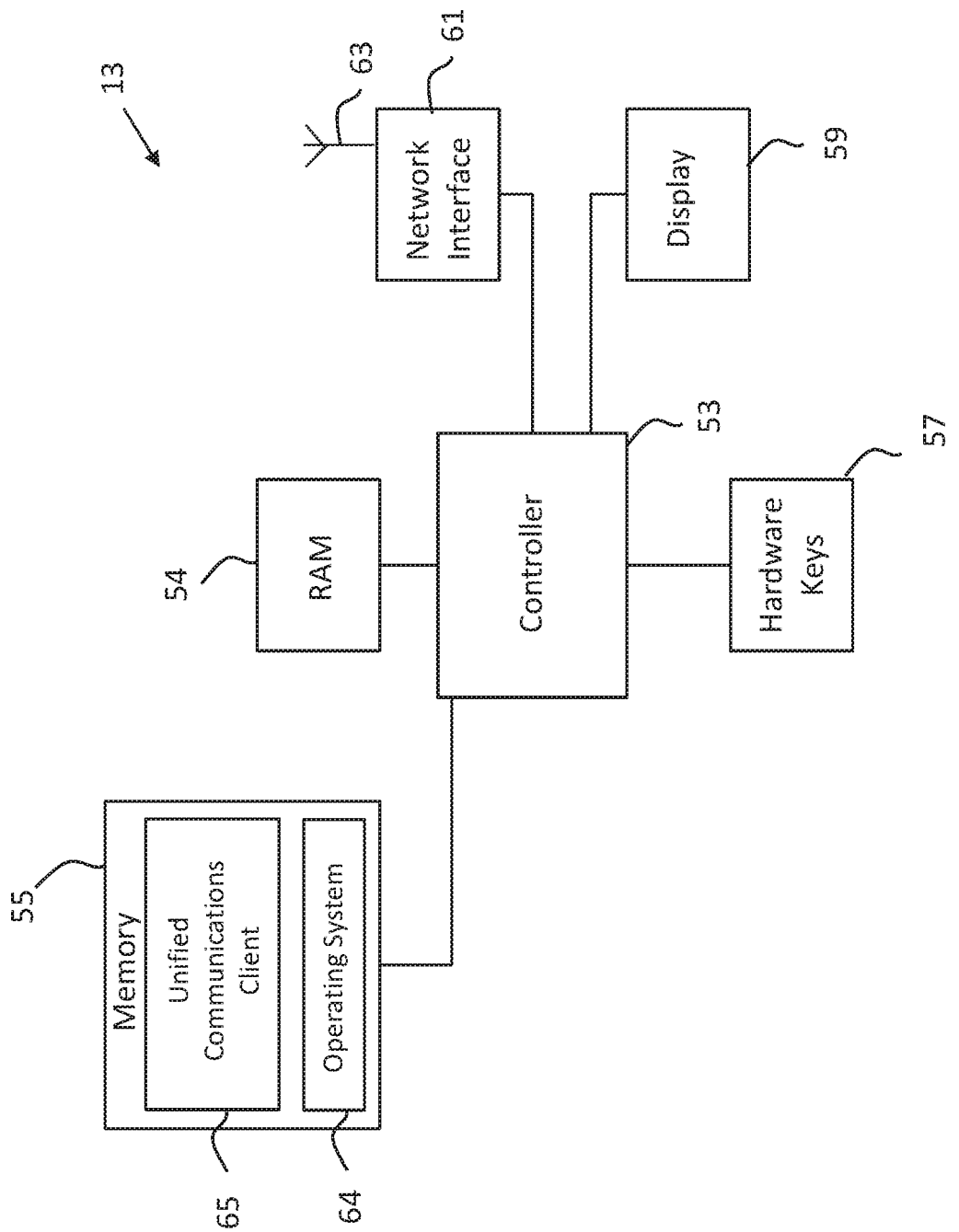
FIG. 5 is a schematic diagram of components of one or more user terminals of FIG. 1.

Referring to FIG. 5, components of the fifth user terminal 13 (by way of example) are shown. The fifth user terminal 13 may comprise a controller 53, RAM 54, a memory 55, hardware keys 57 and a display 59. The fifth user terminal 13 may comprise a network interface 61 for connecting the system to the network 3.

The network interface 61 may comprise a radiofrequency wireless interface for transmitting and/or receiving data using cellular telecommunications protocols, e.g., GSM, 3G, 4G, 5G and other wireless protocols such as Bluetooth and WiFi. An antenna 63 may be provided for this purpose. SMS text messages may be sent using said protocols. Other forms of text messaging service may use said protocols also.

The memory 55 may be a non-volatile memory such as read only memory (ROM), a hard disk drive (HDD) or a solid state drive (SSD). The memory 55 stores, amongst other things, an operating system 64 and may store software applications 65. The RAM 53 is used by the controller 51 for the temporary storage of data. The operating system 64 may contain code which, when executed by the controller 51 in conjunction with the RAM 53, controls operation of each of the hardware components of the fifth user terminal 13.

The controller 53 may take any suitable form. For instance, it may be a microcontroller, plural microcontrollers, a processor, or plural processors.

In some embodiments, the fifth user terminal 13 may also be associated with external software applications not stored on the terminal. These may be applications stored on a remote server device and may run partly or exclusively on the remote server device. These applications may be termed cloud-hosted applications.

The software application 65 provides a UCS client, namely one or more software functions for receiving and transmitting data with the UCS 1, particularly the UCS platform, and the first to fourth terminals 5, 7, 8, 11.

It will be appreciated that the other, first to fourth user terminals 5, 7, 8, 11 may comprise the same or similar functions and features as the fifth user terminal 13.

Figure 6:
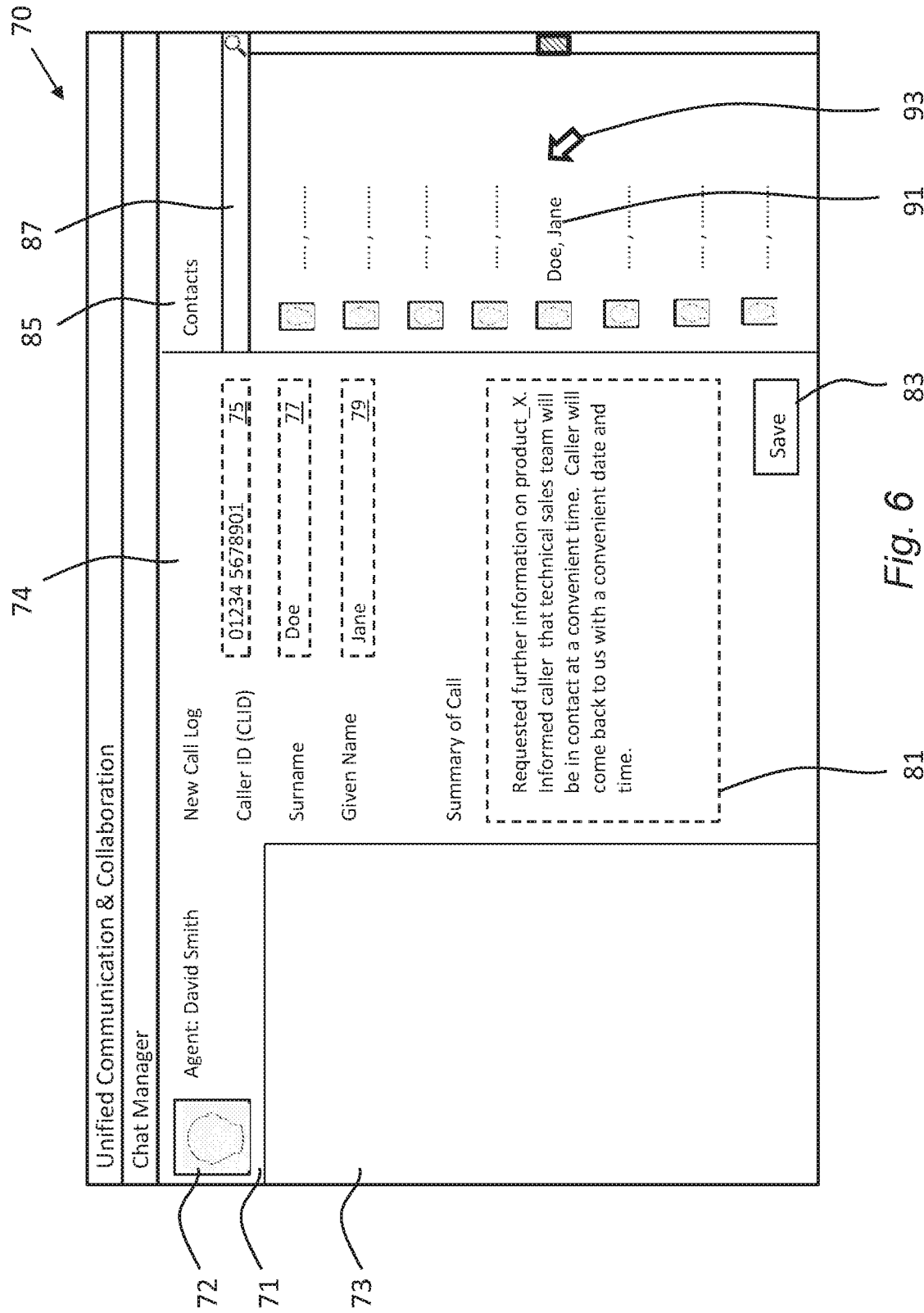
FIG. 6 is a graphical view of a first user interface, associated with a unified communications platform, in accordance with embodiments.

Referring to FIG. 6, a user interface 70 for the UCS 1 is shown. The user interface 70 may be provided as part of the UCS platform 35 for use by call centre agents for the UCS 1. The user interface 70 comprises a plurality of sections, including a chat manager which displays a tab 71 associated with a communications event. In this case, the tab 71 is associated with an initial communications event relating to a received telephone enquiry. Subsequent events may be indicated in the area 73 below the tab 71, i.e. using one or more further tabs.

The tab 71 comprises an agent identifier 72 indicating the call centre agent handling the communication event. The call centre agent may be selected randomly from among a group of available agents, or the agent may be selected based on rules. For example, an agent previously associated with a user may be assigned to the communication event, if available, or agents may be assigned to an ordered handling list. The agent identifier 72 may comprise a photograph or avatar, alongside an agent name, to permit other agents and supervisors to ascertain who handled a particular communication event. The tab 71 also comprises information section 74 storing detailed information relating to the communication event. In the shown example, the agent selects a "new call log" because the communications event is an incoming telephone enquiry.

The information section 74 comprises a plurality of fields. A first field 75 comprises the caller ID (CLID) of the call, which may be input automatically by the UCS platform 35 using information received from the carrying network. A second field 77 comprises a text entry field for inputting the calling user's surname. A third field 79 comprises a text entry field for inputting the calling user's given name. It will be appreciated that, for a subsequent communications event, detection of the same CLID may cause the second and third fields 77, 79 to be automatically completed if the shown information is stored.

A further field 81 comprises a text entry field for inputting a summary of the call. In this case, the call centre agent has inputted the nature of the call, i.e. that the caller, Jane Doe, requested further information on a product_X and that she will come back with a convenient date and time for a sales team member to get in contact.

A save button 83, when selected by the call centre agent, causes automatic creation of a new contact entry in the user details module 40 and the user contact data module 41. A contacts list 85 shows all contacts for the UCS platform 35. The call centre agent may scroll through the list or enter a search term in the search box 87. In the present case, a new entry 91 for the caller is generated from which subsequent communications events can be initiated and/or a historical record of past communications events can be recalled for display.

In some embodiments, the new entry may be created automatically when the call centre agent enters the name information in the second and third fields 77, 79, i.e. without the need to select the save button 83.

Selection of a given contact entry 91 may be by means of positioning a mouse pointer 93 over the name and clicking (or by means of a related selection operation.)

Figure 7:
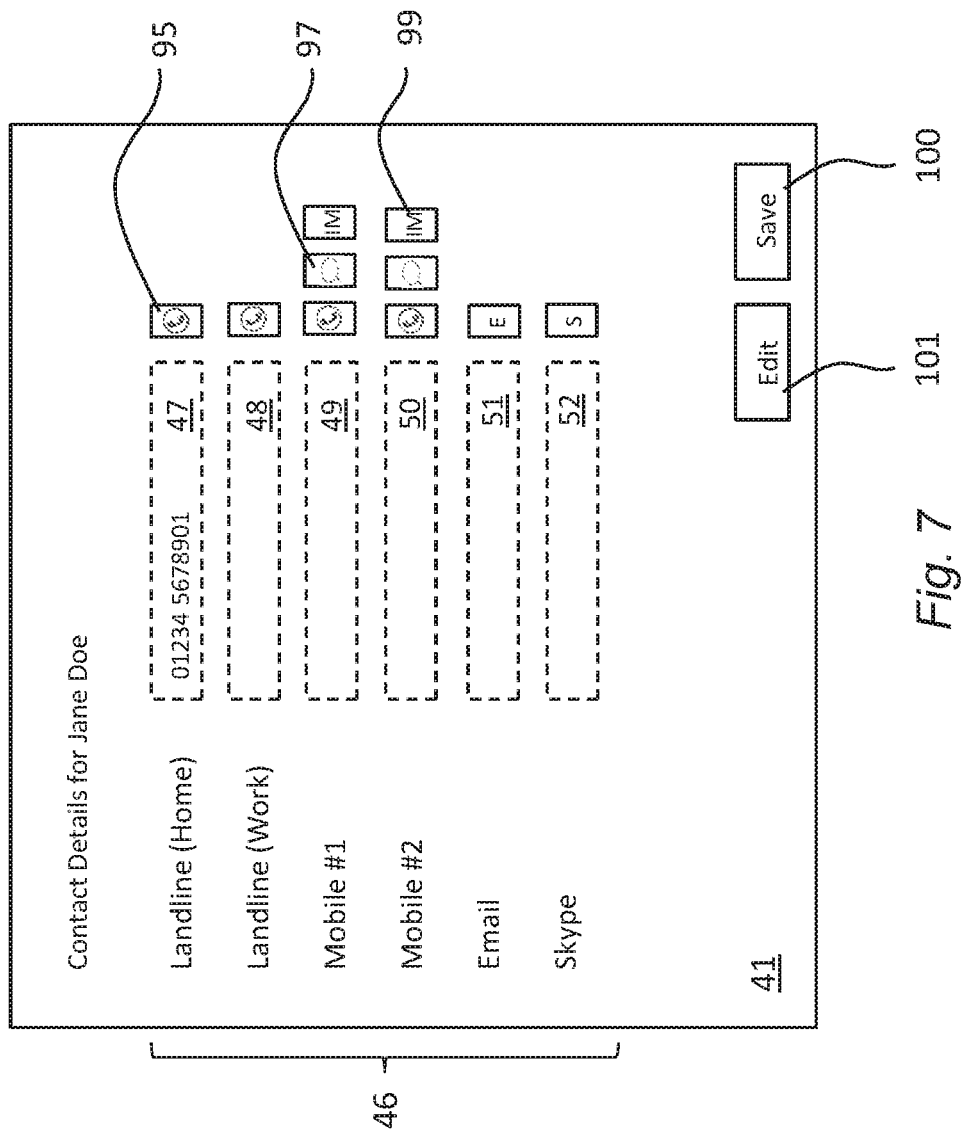
FIG. 7 is a graphical view of a second user interface, associated with the unified communications platform, showing contact details for a first user.

Referring to FIG. 7, the user contact data for the shown caller, Jane Doe, is shown in a second user interface 94. This is responsive to user selection of the relevant contact entry 91, as indicated in FIG. 6.

The second user interface 94 shows the corresponding communications fields 47-52, as shown in FIG. 4B.

By default, the telephone number associated with the CLID is automatically entered in the home landline field 47.

Each of the communications fields 47-52 is associated with one or more communications methods. The communications methods are predefined to avoid, for example, the call centre agent attempting to use SMS to contact a user via their landline number, which may be technically impossible and/or against company protocols of the UCS 1.

Accordingly, against each communication field 47-52 is or are provided one or more selection panels, indicative of the associated communications method(s). Each panel can also be selected by clicking or otherwise selecting the panel to initiate communications via the corresponding method.

For example, a first button 95 corresponds to a voice call communications method. Selection of the first button 95 is effective to initiate a voice call through the UCS platform 35, for example by commencing an "off hook" operation and dialing the number. The voice call may be by means of VoIP.

For example, a second button 97 corresponds to a SMS text message communications method. Selection of the second button 97 is effective to open a text message composition tool through the UCS platform 35.

For example, a third button 99 corresponds to an instant messaging message communications method. Selection of the third button 99 is effective to open an instant messaging composition tool through the UCS platform 35.

Save and edit buttons 100, 101 provide the ability for the call centre agent to manually change entries, if needed.

Figure 8:
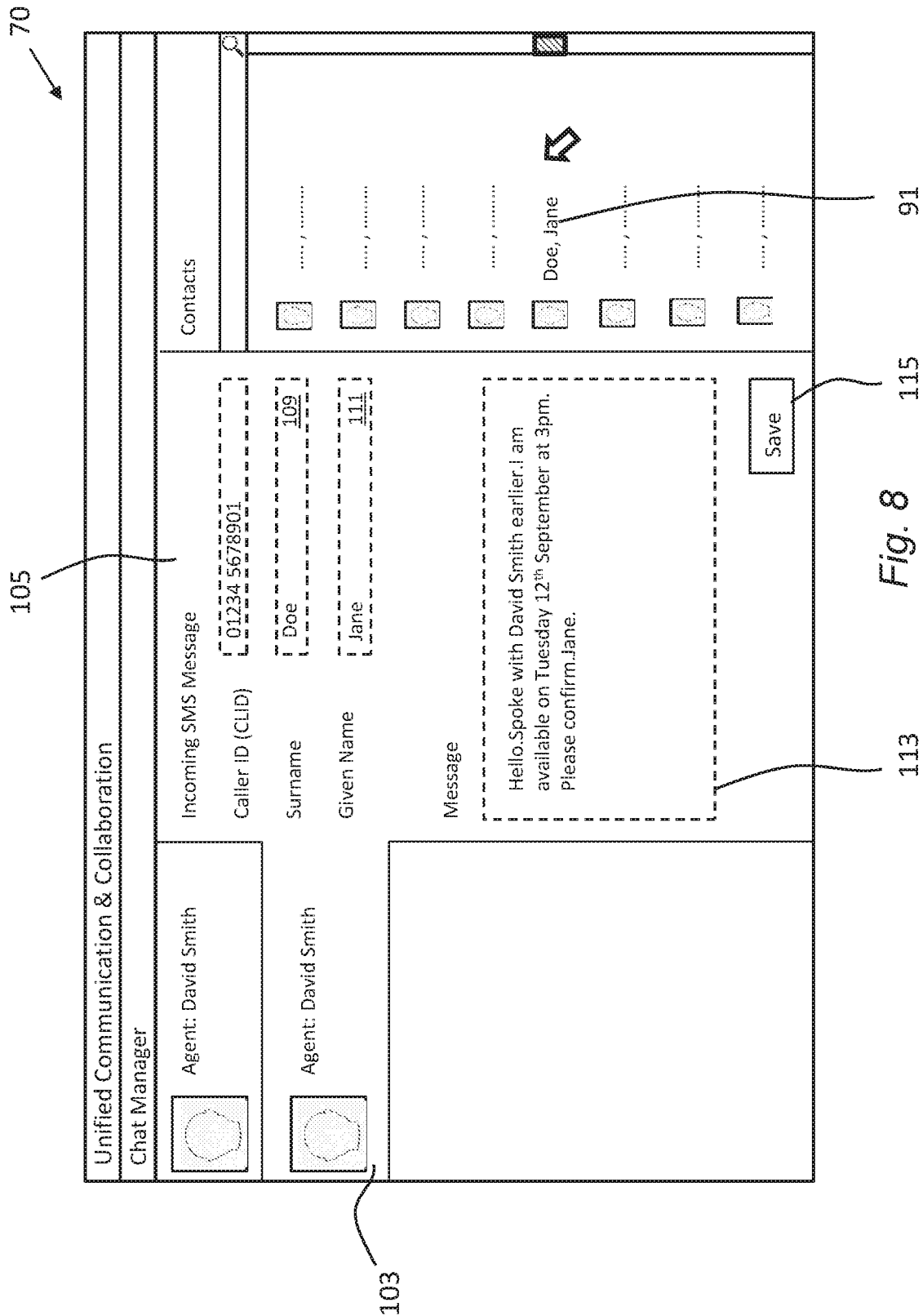
FIG. 8 is a graphical view of the first user interface for a subsequent communications event, in accordance with embodiments.

Referring now to FIG. 8, the user interface 70 is shown for a subsequent communications event. More particularly, responsive to a received SMS text message from the same calling user 91, which is identifiable by means of the CLID corresponding to that stored in the user contact data 41 for Jane Doe, a new event tab 103 is opened. The information section 105 of the new event 103 is automatically completed with the CLID for the same telephone number, as are the surname and given name fields 109, 111. A message field 113 provides the body of the SMS text message for the call centre agent to read.

A selectable button 115 permits the call centre agent to save the new event 103 to update the conversation with Jane Doe. In some embodiments, this is performed automatically, without user intervention. In the shown example, the caller provides a follow-up message, providing a convenient date and time for a follow-up call.

Given that the new event has been received by SMS, the UCS platform 35 is configured to determine that the telephone number corresponds to a mobile telephone, rather than a landline telephone, and thereby that the received communication is by means of a second communications method, i.e. SMS. Responsive to this determination, the telephone number is moved to a mobile telephone field in the user contact data 41, for example without human intervention.

Referring to FIG. 9, for example, the user interface 94 shows that the user contact data 41 is updated automatically, such that the telephone number is moved from the home landline field 47 to the mobile #1 field 49.

As a consequence, the call centre agent has the option of subsequently contacting the caller by one or more of voice call, SMS text messaging or instant messaging.

In some embodiments, the automatic update is performed entirely without user intervention. In some embodiments, a prompt screen may be provided notifying the call centre agent that the update is proposed; the call centre agent may accept the update, or reject it, using a single click.

Figure 10:
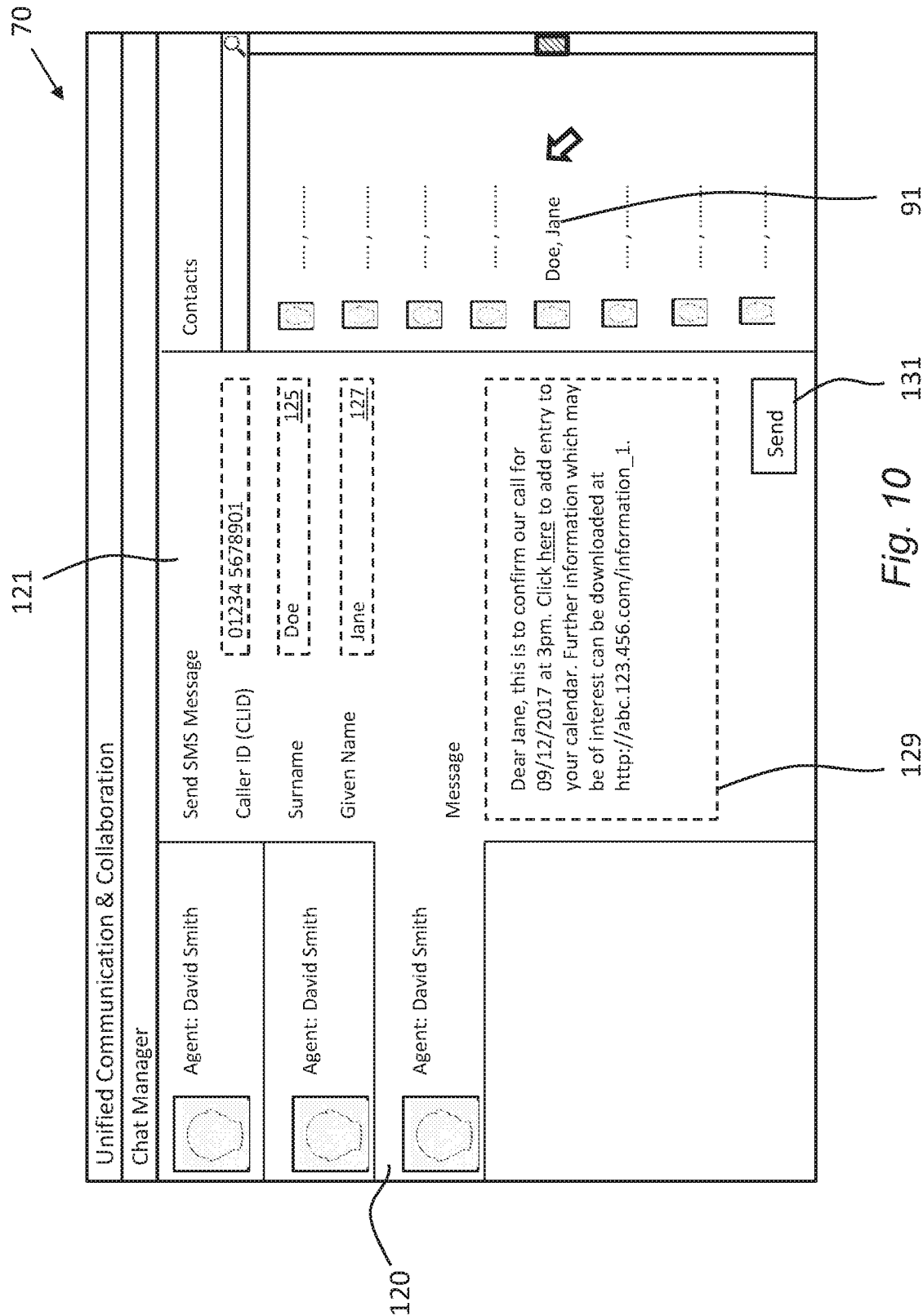
FIG. 10 is a graphical view of the first user interface for a further, subsequent communications event, in accordance with embodiments.

Referring to FIG. 10, the user interface 70 is shown for a subsequent communications event. In this case, the call centre agent wishes to confirm the proposed date and time for the follow-up call, to the calling user 91. The call centre agent may also wish to provide a URL link to the calling user 91 to enable a diary entry to be created in the calling user's Outlook calendar and/or to provide a URL link for downloaded information relating to the enquiry, e.g., a product summary.

Given that the user contact data 41 is updated to permit SMS text messages to be sent to the calling user's number, the call centre agent may select the appropriate button 97 shown in FIG. 9.

Returning to FIG. 10, a new, third event tab 120 is opened. The information section 121 of the new event 120 is automatically completed with the CLID for the same telephone number, as are the surname and given name fields 125, 127. A message field 129 provides a text entry box for composing a reply text message.

In this case, the call centre agent may enter a text message in the message field 129, and may optionally give URL links to, for example, an Outlook calendar entry and/or a URL for downloading related information.

The text message in the message field 129 may be sent as an SMS responsive to selection of the send button 131. The UCS platform 35 is configured to send the message as an SMS message in the conventional way to the mobile number.

Referring to FIG. 11, a flow diagram is shown, indicating processing steps which may be performed by one or more software applications in association with one or more processors. A first step S11.1 comprises providing one or more contact records comprising a plurality of fields, at least one record having a first user identifier in a first field having an associated first communications method. A subsequent step S11.2 comprises receiving a communication from a user by means of a second communications method using a second user identifier. A subsequent step S11.3 comprises identifying a contact record for a user based on the second user identifier corresponding to at least part of the first user identifier (e.g., the first and second user identifiers can be identical, or partly the same with a predetermined minimum number of characters matching.) A subsequent step S11.4 comprises updating said contact record so that at least one of the fields contains new information from the second user identifier.

For example, the user identifier may be a telephone number.

FIG. 12 is a more detailed flow diagram, indicating processing steps which may be performed by one or more software applications in association with one or more processors. A first step S12.1 comprises providing one or more contact records comprising at least a landline field and a mobile field. A subsequent step S12.2 comprises receiving a voice call using a telephone number. A subsequent step S12.3 comprises storing the telephone number in a landline field, which may be a default setting. A subsequent step S12.4 comprises receiving an SMS communication using the same telephone number. A subsequent step S12.5 comprises identifying the contact record for the user based on the telephone number. A subsequent step S12.6 comprises updating said contact record so that the number is associated with a mobile field. A subsequent, optional step, step 12.7 may comprise removing the telephone number from the landline field, which can take place before, at the same time as, or subsequent to step S12.6. A subsequent, optional step S12.8 may comprise making a subsequent communication using SMS.

It will be appreciated that step S12.3 assumes that the telephone number is not already present in a contact record, in which case a new record is created. There may be an additional identifying step.

It will be appreciated that certain steps of the FIG. 11 and FIG. 12 methods may be omitted or re-ordered.

The methods described above are not limited to a UCS 1, but may also be used with any terminal storing a contact list or phonebook in digital form. For example, most mobile telephones, tablets and PDAs store a contact list or phonebook, e.g., in the form of an App. In other embodiments, therefore, the methods described above may be applied to such terminals such that, for example, the default assignment of a telephone number to a first field may be updated to another field based on receipt of a communication by means of another method associated with that other field.

Another embodiment will now be briefly described. It is known for web chat sessions, video conferences, etc., to connect users on the basis of an identifying key. For example, the identifying key for a user may be a combination of their email address and surname. A first communication may therefore comprise a chat session having the identifier of an email address and surname. At the first time a user communicates in this way, a new contact record may be created for the user, with their email address and surname entered in the "chat" field, e.g., for subsequently initiating a chat with said user. Only the surname may be stored in a "name" field for the user. Subsequently, an email may be received from the user, which is naturally accompanied by their email address and, usually, their full name. The email address is identical to that stored in the "chat" field, and hence the particular contact record can be identified. The "name" field can then be automatically updated with the user's full name.

Another embodiment, following the above example, may provide in contact records a first field associated with a plurality of communication methods, such as email and chat, and a second field also associated with a plurality of communication methods, such as email, chat and voice. The second field may be used to hold a user identifier such as "name" which may be associated with the multiple communication methods, for example all available communication methods. One of the contact records for a user may have a first user identifier in the first field, such as an email address (e.g., johndoe@gmail.com) and a first user descriptor in the second field (e.g., "Doe"). These may have been entered manually, or as a result of, for example, a chat session, associated with said fields. However, the second field does not comprise the complete name and hence there may be a need to update this in order to help distinguish the user from other users with a same or similar name. This is particularly important in the context of a UCS contact database where, for a large organization, there may be large number of contacts. Updating them manually is time consuming and requires the cooperation of the relevant user, or an administrator, for example, to notice that a descriptor is not complete. Indeed, it may not be evident. Accordingly, embodiments may involve the system identifying a received communication having a corresponding second user identifier (e.g., email address) corresponding to the first user identifier, hence enabling identification of a relevant contact record. Further, responsive to determining receipt by a predefined communication method, e.g., email, the contact record may be updated by way of updating the user descriptor in the second field, e.g., to complete the name to John Doe. This is because some communication methods, such as emails, may carry more complete information, either in a header file which accompanies the email, or may be identified using known methods such as natural language processing, from the body of the email. The embodiment is not limited to these communication methods, however.

FIG. 13 is a flow diagram, indicating processing steps which may be performed by one or more software applications in association with one or more processors. A first step 13.1 may comprise providing a contact record for each of a plurality of users, the contact record for each user comprising a plurality of fields including a first field associated with a plurality of communication methods and a second field associated with a plurality of communications methods, wherein at least one of the contact records for a first user has a first user identifier in the first field and a first user descriptor in the second field. A second step 13.2 may comprise receiving a communication from a user having an associated second user identifier corresponding to the first user identifier. A third step 13.3 may comprise identifying the contact record for the first user based on the second user identifier. A fourth step 13.4 may comprise determining that the received communication is received by means of a predefined communications method. A fifth step 13.5 may comprise updating, in response to determining receipt by said predefined communications method, the identified contact record so that the first user descriptor is updated in the second field. It will be appreciated that certain steps of the FIG. 13 method may be omitted or re-ordered.

The above-described methods and systems provide an intuitive and convenient way of updating contact lists, phonebooks etc., providing alternative means of communicating with users whilst reducing or avoiding user interactions, processing resources and or time resources.

An example UCS 1 that may be employed is Mitel Networks Corporation's MiCollab™.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method for updating contact details of users, the method comprising:
   providing a contact record for each of a plurality of users, the contact record for each user comprising a plurality of fields, including a first field associated with a first communication method and a second field associated with a second, different communication method, wherein at least one of the contact records for a first user has a first user identifier in the first field;
   receiving a communication from a user having an associated second user identifier corresponding to at least part of the first user identifier;
   identifying the contact record for the first user based on the second user identifier;
   determining that the received communication is received by means of the second communication method of the first and second communication methods;
   updating, in response to determining receipt by said second communications method, the identified contact record so that the first user identifier is inserted in the second field associated with said second communications method; and
   wherein the updating is performed automatically, without human intervention.

2. The method of claim 1, wherein the second user identifier is the same as the first user identifier.

3. The method of claim 2, wherein the first user identifier is a telephone number, the first field is a non-mobile telephone field, the second communications method is a text message associated with the same telephone number, and the contact record is updated so that the telephone number is associated with a mobile telephone field.

4. The method of claim 3, wherein the non-mobile telephone field is a landline telephone field.

5. The method of claim 4, further comprising removing the telephone number from the non-mobile telephone field of the contact record for the first user.

6. The method of claim 3, wherein the second communications method is an SMS text message.

7. The method of claim 6, wherein the non-mobile telephone field is a landline telephone field.

8. The method of claim 7, further comprising removing the telephone number from the non-mobile telephone field of the contact record for the first user.

9. The method of claim 3, further comprising removing the telephone number from the non-mobile telephone field of the contact record for the first user.

10. The method of claim 1, performed at a unified communications system comprising a user database for storing contact records associated with one or more registered users of the unified communications system and/or their associated user terminal(s).

11. The method of claim 10, performed by a mobile communications device comprising a memory storing contact records associated with users and/or their associated user terminals.

12. The method of claim 1, performed by a mobile communications device comprising a memory storing contact records associated with users and/or their associated user terminals.

13. A method for updating contact details of users, the method comprising:
   providing a contact record for each of a plurality of users, the contact record for each user comprising a plurality of fields including a first field associated with a plurality of communication methods and a second field associated with a plurality of communications methods, wherein at least one of the contact records for a first user has a first user identifier in the first field and a first user descriptor in the second field;
   receiving a communication from a user having an associated second user identifier corresponding to the first user identifier;
   identifying the contact record for the first user based on the second user identifier;
   determining that the received communication is received by means of a predefined communications method of the plurality of communications methods; and
   updating, in response to determining receipt by said predefined communications method, the identified contact record so that the first user descriptor is updated in the second field,
   wherein the updating is performed automatically, without human intervention.

14. The method of claim 13, performed at a unified communications system comprising, or having access to, an associated user database for storing contact records associated with one or more registered users of the unified communications system and/or their associated user terminal(s).

15. The method of claim 13, performed by a mobile communications device comprising a memory storing contact records associated with users and/or their associated user terminals.

16. A system configured to perform the method of claim 1.

17. The system of claim 16 comprising a unified communications system.

18. A computer program, the computer program comprising instructions that when executed by a computer control it to perform the method of claim 1.

19. A non-transitory computer-readable medium having stored thereon computer-readable code, which, when executed by at least one processor, causes the at least one processor to perform a method, comprising:
- providing a contact record for each of a plurality of users, the contact record for each user comprising a plurality of fields, including a first field associated with a first communication method and a second field associated with a second, different communication method, wherein at least one of the contact records for a first user has a first user identifier in the first field;
- receiving a communication from a user having an associated second user identifier corresponding to at least part of the first user identifier;
- identifying the contact record for the first user based on the second user identifier;
- determining that the received communication is received by means of the second communication method of the first and second communication methods; and
- updating, in response to determining receipt by said second communications method, the identified contact record so that the first user identifier is inserted in the second field associated with said second communications method,
- wherein the updating is performed automatically, without human intervention.

20. An apparatus, the apparatus having at least one processor and at least one memory having computer-readable code stored thereon which when executed controls the at least one processor:
- to provide a contact record for each of a plurality of users, the contact record for each user comprising a plurality of fields, including a first field associated with a first communication method and a second field associated with a second, different communication method, wherein at least one of the contact records for a first user has a first user identifier in the first field;
- to receive a communication from a user having an associated second user identifier corresponding to at least part of the first user identifier;
- to identify the contact record for the first user based on the second user identifier;
- to determine that the received communication is received by means of the second communication method of the first and second communication methods; and
- to update, in response to determining receipt by said second communications method, the identified contact record, so that the first user identifier is inserted in the second field associated with said second communications method,
- wherein the updating is performed automatically, without human intervention.

* * * * *